United States Patent
Yang et al.

(10) Patent No.: US 9,122,563 B2
(45) Date of Patent: Sep. 1, 2015

(54) COMPUTING MINIMAL POLYNOMIALS

(75) Inventors: Xu Yang, Beijing (CN); Zhouchen Lin, Beijing (CN); Sijun Liu, Beijing (CN); Tianjun Ye, Beijing (CN); Dongmei Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1577 days.

(21) Appl. No.: 12/422,315

(22) Filed: Apr. 13, 2009

(65) Prior Publication Data

US 2010/0262643 A1 Oct. 14, 2010

(51) Int. Cl.
| | |
|---|---|
| G06F 7/38 | (2006.01) |
| G06F 7/72 | (2006.01) |
| G06F 7/16 | (2006.01) |
| G06F 7/12 | (2006.01) |

(52) U.S. Cl.
CPC . *G06F 7/724* (2013.01); *G06F 7/12* (2013.01); *G06F 7/16* (2013.01)

(58) Field of Classification Search
None
See application file for complete search history.

(56) References Cited

U.S. PATENT DOCUMENTS

| | | | |
|---|---|---|---|
| 6,523,053 B1 | 2/2003 | Lee et al. | |
| 6,701,028 B1 * | 3/2004 | Crandall | 382/279 |
| 7,003,715 B1 | 2/2006 | Thurston | |
| 7,137,007 B2 * | 11/2006 | Terao et al. | 713/180 |
| 7,190,681 B1 * | 3/2007 | Wu | 370/316 |
| 7,583,747 B1 * | 9/2009 | Damen et al. | 375/267 |
| 7,979,780 B2 * | 7/2011 | Kamiya | 714/781 |
| 2005/0086484 A1 * | 4/2005 | Muratani | 713/176 |
| 2006/0206554 A1 | 9/2006 | Lauter et al. | |
| 2007/0300135 A1 * | 12/2007 | Kamiya | 714/781 |
| 2010/0198902 A1 * | 8/2010 | Yang et al. | 708/605 |
| 2012/0057695 A1 * | 3/2012 | Lazich et al. | 380/28 |

OTHER PUBLICATIONS

Landau, Susan., "Simplification of Nested Radicals", retrieved at <<http://historical.ncstrl.org/tr/ps/umass_cs/UM-CS-1990-113.ps>>, Jul. 16, 1993, pp. 1-34.

Giesbrecht, et al., "Factoring and Decomposing Ore Polynomials over Fq (t)", International Conference on Symbolic and Algebraic Computation, retrieved at <<http://www.cecm.sfu.ca~pborwein/MITACS/papers/giesbrecht.pdf>>, Aug. 3-6, 2003, pp. 127-134.

Armendariz, et al., "On the Computation of the Radical of Polynomial Complete Intersection Ideals", Proceedings of the 11th International Symposium on Applied Algebra, Algebraic Algorithms and Error-Correcting Codes, retrieved at <<http://www.udesa.edu.ar/files/UAMat/Archivos/DOC05.PDF>>, Oct. 1995, pp. 1-20.

(Continued)

*Primary Examiner* — Henry Tsai
*Assistant Examiner* — Aurangzeb Hassan
(74) *Attorney, Agent, or Firm* — Dan Choi; Micah Goldsmith; Micky Minhas (57) ABSTRACT

Described is a technology, such as implemented in a computational software program, by which a minimal polynomial is efficiently determined for a radical expression over the ring Z of integer numbers or the ring Q of rational numbers. The levels of the radical are grouped into a level permutation group that is used to find a level permutation set. An annihilation polynomial is found based upon the level permutation set. The annihilation polynomial is factored, and a selection mechanism selects the minimal polynomial based upon the annihilation polynomial's factors.

19 Claims, 4 Drawing Sheets

(56) References Cited

OTHER PUBLICATIONS

Heintz, et al., "On the Time—Space Complexity of Geometric Elimination Procedures?", Applicable Algebra in Engineering, Communication and Computing, retrieved at <<http://community.corest.com/~wata/files/HeMaWa_2001.pdf>>, vol. 11, No. 4, 2001, pp. 1-57.

Anai, et al., "Radical Representation of Polynomial Roots", Journal of Japan Society for Symbolic and Algebraic Computation, retrieved at <<http://www.jssac.org/Editor/Suushiki/V09/No1/V9N1_108.pdf>>, vol. 9, No. 1, 2002, pp. 53-79.

Kaltofen, et al., "Challenges of Symbolic Computation My Favorite Open Problems", Journal of Symbolic Computation, retrieved at <<http://www4.ncsu.edu/~kaltofen/bibliography/2K/Ka2K.pdf>>, vol. 29, No. 6, Jun. 2000, pp. 1-36.

Shoup, Victor., "Efficient Computation of Minimal Polynomials in Algebraic Extensions of Finite Fields", Proceedings of the 1999 international symposium on Symbolic and algebraic computation, retrieved at <<http://www.shoup.net/papers/mpol.ps>>, Mar. 11, 1999, pp. 1-15.

\* cited by examiner

COMPUTING MINIMAL POLYNOMIALS

CROSS-REFERENCE TO RELATED APPLICATION

The present application is related to U.S. patent application Ser. No. 12/364,533, filed Feb. 3, 2009, assigned to the assignee of the present application and hereby incorporated by reference

BACKGROUND

Minimal polynomials are widely used in symbolic computation. Computing the minimal polynomial of a radical expression (or more simply "radical" as used herein) is a basic problem in symbolic computation. Some examples include factorization of polynomials in an algebraic extension field, rationalization of denominators, and simplification of complex expressions.

Determining the minimal polynomial of radicals over a ring is a well known question for problems related to algebraic extension. One conventional technique used by computational software programs finds an annihilation polynomial, factors the polynomial, and then finds the minimal polynomial from the factors. However, there are drawbacks to such conventional techniques. Any improvement in computing the minimal polynomials for radicals over the ring Z of integer numbers or the field (or ring, as a field is also a ring) Q of rational numbers that improves the performance of computational software programs is thus desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a minimal polynomial is efficiently determined for radicals over the ring Z of integer numbers or the ring Q of rational numbers based upon a level permutation set. The levels of the radicals are processed into a permutation group, from which the level permutation set is obtained. An annihilation polynomial is found by approximating the elements of the level permutation set. The annihilation polynomial is factored into its factors, which are then traversed to find the minimal polynomial by locating a factor with its leading coefficient less than one. Iterating with higher precision in approximation is performed if needed to find a factor with its leading coefficient less than one.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards finding an annihilation polynomial for radicals over a ring using a level permutation group method, along with a numerical method to compute the annihilation polynomial and select the minimal polynomial from factors. In general, these methods are used in a computational software program to efficiently find the minimal polynomial for radicals.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing in general.

Figure 1:
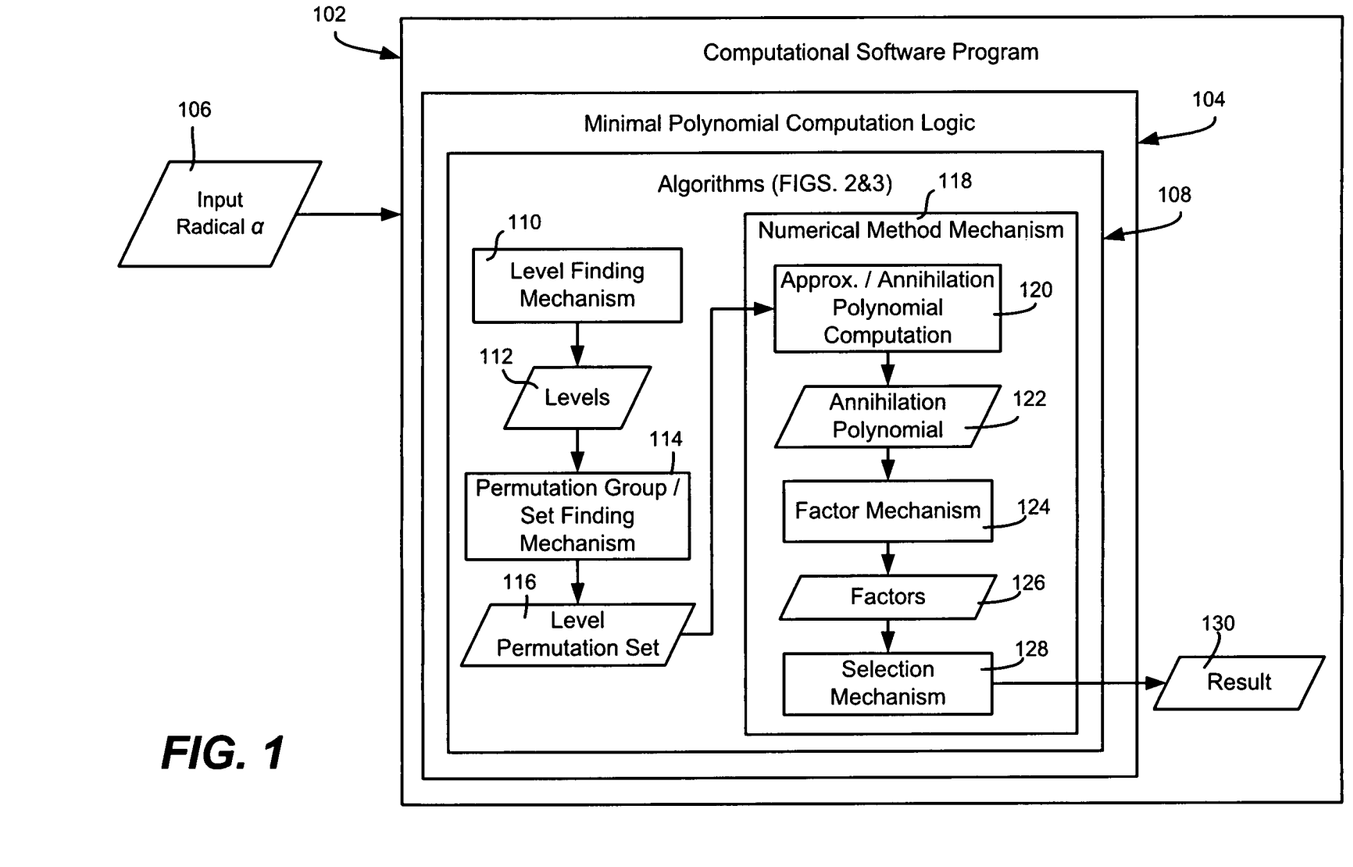
FIG. 1 is a block diagram showing example components for computing minimal polynomials of radical expressions over the ring Z of integer numbers or the field Q of rational numbers.

FIG. 1 shows various aspects related to finding an annihilation polynomial by using a level permutation group based on the structure of radicals. In the example implementation of FIG. 1, a computational software program 102 includes logic 104 for computing a minimal polynomial of a given radical expression, or radicals 106. To this end, the logic 104 includes algorithms 108 (described below with reference to FIGS. 2 and 3), including a level finding mechanism 110 that finds the levels 112 of the radicals 106, and a permutation group/permutation set finding mechanism 114 that finds a level permutation set 116 as described below.

The level permutation set 116 is processed by a numerical method mechanism 118, which includes an approximation/annihilation polynomial computation mechanism 120 that computes an annihilation polynomial 122 based upon elements of the level permutation set 116. The annihilation polynomial 122 is factored by a factor mechanism 124 (e.g., using known algorithms) into a set of factors 126. A selection mechanism 128 selects the minimal polynomial from the factors 126.

Radicals are defined herein to be nested radicals or the results of nested radicals after arithmetic operations. If the ring to which the items in these nested radical belong is known, the radicals are said to be radicals over the ring. For example, $$\frac{\sqrt{5+\sqrt{2}}}{\sqrt[3]{3+2\sqrt{2}}} - \sqrt[3]{\frac{3}{4}} \times \sqrt{6}$$

are radicals over Q if ¾ is viewed as an element in Q. They are radicals over Z if ¾ is viewed as 3 divided by 4. And $$\sqrt[3]{\sqrt{\frac{2y}{5}} + \sqrt[5]{3x}}$$

are radicals over $Q[x, y]$.

To get an image of radicals, the items under i radical signs are considered to be at the $(i+1)^{th}$-level. Taking $$\frac{7\sqrt{5+\sqrt{2}}}{\sqrt[3]{3+2\sqrt{2+\sqrt{3+\sqrt{5}}}}} - \sqrt[3]{\frac{3}{4}} \times \sqrt{6}$$

as an example, the first level (with no higher radical signs) are items from the above example are:

$$7, \sqrt{5+\sqrt{2}}, \sqrt[3]{3+2\sqrt{2+\sqrt{3+\sqrt{5}}}}, \sqrt[3]{\frac{3}{4}}, \sqrt{6}.$$

The second level comprises items under one radical sign, which are $$5, \sqrt{2}, 3, 2, \sqrt{2+\sqrt{3+\sqrt{5}}}, \frac{3}{4}, 6.$$

These can also be obtained by collecting the first level of items in the first level. As can be seen, the third level comprises $$2, 2, \sqrt{3+\sqrt{5}},$$

the fourth level comprises 3, $\sqrt{5}$ and the fifth level is 5.

These primitive items have certain level properties, including that a first level property is that the $(i+1)^{th}$ level can be obtained by collecting the first levels of items in the $i^{th}$ level. A second level property is that every item in the $i^{th}$ level either belongs to the ring, or is a rational power of results after arithmetic operations of items in the $(i+1)^{th}$ level. By the first property the levels 114 of a radical are found by the level finding mechanism 110. The second property may be used to find the annihilation polynomial.

For radicals $\alpha$, suppose its $k^{th}$ level is known, which is $\{a_1, a_2, \ldots, a_n\}$. According to the second property, $a_i$ has the form $$l^{\frac{n}{m}}$$

or belongs to the ring. If $a_i$ has the form $$l^{\frac{n}{m}},$$

then let $$A_i = \{l^{\frac{n}{m}}, l^{\frac{n}{m}}\varepsilon_m, l^{\frac{n}{m}}\varepsilon_m^2, \ldots, l^{\frac{n}{m}}\varepsilon_m^{m-1}\}, \text{ where } \varepsilon_m = e^{\frac{2\pi i}{m}}.$$

Let $P_i$ be the permutation group on $A_i$. If $a_i$ belongs to the ring, then let $A_i = \{a_1\}$ and $P_i = \{id\}$. Also, if $a_i = a_j$, then $P_i = P_j$. With these permutation groups a $k^{th}$ level permutation group may be constructed.

The $k^{th}$ level permutation group $U_k$ is defined to be:

$$U_k = P_1 \otimes P_2 \otimes \ldots \otimes P_n$$

and every element $u_k$ in $U_k$ has the form $$u_k = \sigma_{1k} \otimes \sigma_{2k} \otimes \ldots \otimes \sigma_{nk}, \sigma_{ik} \in P_i \text{ and } \sigma_{ik} = \sigma_{jk} \text{ if } a_i = a_j,$$

with the action $u_k(\alpha) = \alpha'$, where $\alpha'$ is the result obtained after changing every $a_i$ in $k^{th}$-level to $\sigma_{ik}(a_i)$. Generally, the union of all the $k^{th}$-level permutation groups is said to be a level permutation set.

At the same time, successive actions of elements in this group are not allowed, because after the first action, $\alpha$ is changed to $\alpha'$. but the second action may not belong to the permutation group of $\alpha'$. Therefore a modification is made to define successive actions. Considering successive actions $\sigma_2\sigma_1(\alpha)$, to make this successive action have meaning, let $\sigma_1(\alpha) = \alpha'$ and $\sigma_2$ be elements in the level permutation group of $\alpha'$. Additionally, this rule can be applied to $\sigma_n \ldots \sigma_2\sigma_1(\alpha)$.

By way of example, suppose $$\alpha = \sqrt{1+\sqrt{5}} + \sqrt[3]{2+\sqrt{5}}.$$

To find its levels:

First level: $\sqrt{1+\sqrt{5}}, \sqrt[3]{2+\sqrt{5}}$

Second level: 1, $\sqrt{5}$, 2, $\sqrt{5}$

Third level: 5, 5

Therefore:

$$U_3 = \{id \otimes id, id \otimes id\}$$

$$U_2 = \{id \otimes id \otimes id \otimes id, id \otimes (\sqrt{5}, -\sqrt{5}) \otimes id \otimes (\sqrt{5}, -\sqrt{5})\}$$

$$U_1 = \{id \otimes id, id \otimes (\sqrt[3]{2+\sqrt{5}}, \sqrt[3]{2+\sqrt{5}}\varepsilon_3),$$
$$id \otimes (\sqrt[3]{2+\sqrt{5}}, \sqrt[3]{2+\sqrt{5}}\varepsilon_3^2), (\sqrt{1+\sqrt{5}}, -\sqrt{1+\sqrt{5}}) \otimes id,$$
$$(\sqrt{1+\sqrt{5}}, -\sqrt{1+\sqrt{5}}) \otimes (\sqrt[3]{2+\sqrt{5}}, \sqrt[3]{2+\sqrt{5}}\varepsilon_3),$$
$$(\sqrt{1+\sqrt{5}}, -\sqrt{1+\sqrt{5}}) \otimes (\sqrt[3]{2+\sqrt{5}}, \sqrt[3]{2+\sqrt{5}}\varepsilon_3^2)\}$$

To construct successive actions, first, taking an arbitrary action in the level permutation group of $\alpha$, selecting $$\sigma_{22} = id \otimes (\sqrt{5}, -\sqrt{5}) \otimes id \otimes (\sqrt{5}, -\sqrt{5}), \text{ obtains}$$

$$\alpha' = \sigma_{22}(\alpha) = \sqrt{1-\sqrt{5}} + \sqrt[3]{2-\sqrt{5}}.$$

Next, find the level permutation set of $\alpha'$ and select one element. Suppose $\sigma_{21}$ is selected, whereby $$U_1 = \{id \otimes id, id \otimes (\sqrt[3]{2-\sqrt{5}}, \sqrt[3]{2-\sqrt{5}}\varepsilon_3),$$
$$id \otimes (\sqrt[3]{2-\sqrt{5}}, \sqrt[3]{2-\sqrt{5}}\varepsilon_3^2), (\sqrt{1-\sqrt{5}}, -\sqrt{1-\sqrt{5}}) \otimes id,$$
$$(\sqrt{1-\sqrt{5}}, -\sqrt{1-\sqrt{5}}) \otimes (\sqrt[3]{2-\sqrt{5}}, \sqrt[3]{2-\sqrt{5}}\varepsilon_3),$$
$$(\sqrt{1-\sqrt{5}}, -\sqrt{1-\sqrt{5}}) \otimes (\sqrt[3]{2-\sqrt{5}}, \sqrt[3]{2-\sqrt{5}}\varepsilon_3^2)\}$$

and $$\sigma_{21} = id \otimes (\sqrt[3]{2-\sqrt{5}}, \sqrt[3]{2-\sqrt{5}}\varepsilon_3), \text{ obtains}$$

$$\sigma_{21}\sigma_{22}(\alpha) = \sqrt{1-\sqrt{5}} + \sqrt[3]{2-\sqrt{5}}\varepsilon_3.$$

The following theorem provides a theoretical foundation to find a minimal polynomial. For a radicals $\alpha$ over ring V (which can be Z, Q, Q[x], Q[x, y, ..., z], Z[x], Z[x, y, ..., z])

with n levels, let the level permutation set $\gamma(\alpha)=\{\sigma_1\sigma_2 \ldots \sigma_n(\alpha)|\sigma_i \in i^{th}$-level permutataion group}; then if there is no division operation in $\alpha$, the annihilation polynomial $f(x)= \Pi_{\beta\in\gamma(\alpha)}(x-\beta) \in V[x]$.

Otherwise, the annihilation polynomial $f(x)=\Pi_{\beta\in\gamma(\alpha)}(x-\beta) \in P[x]$, where P is the fraction field of V.

Figure 2:
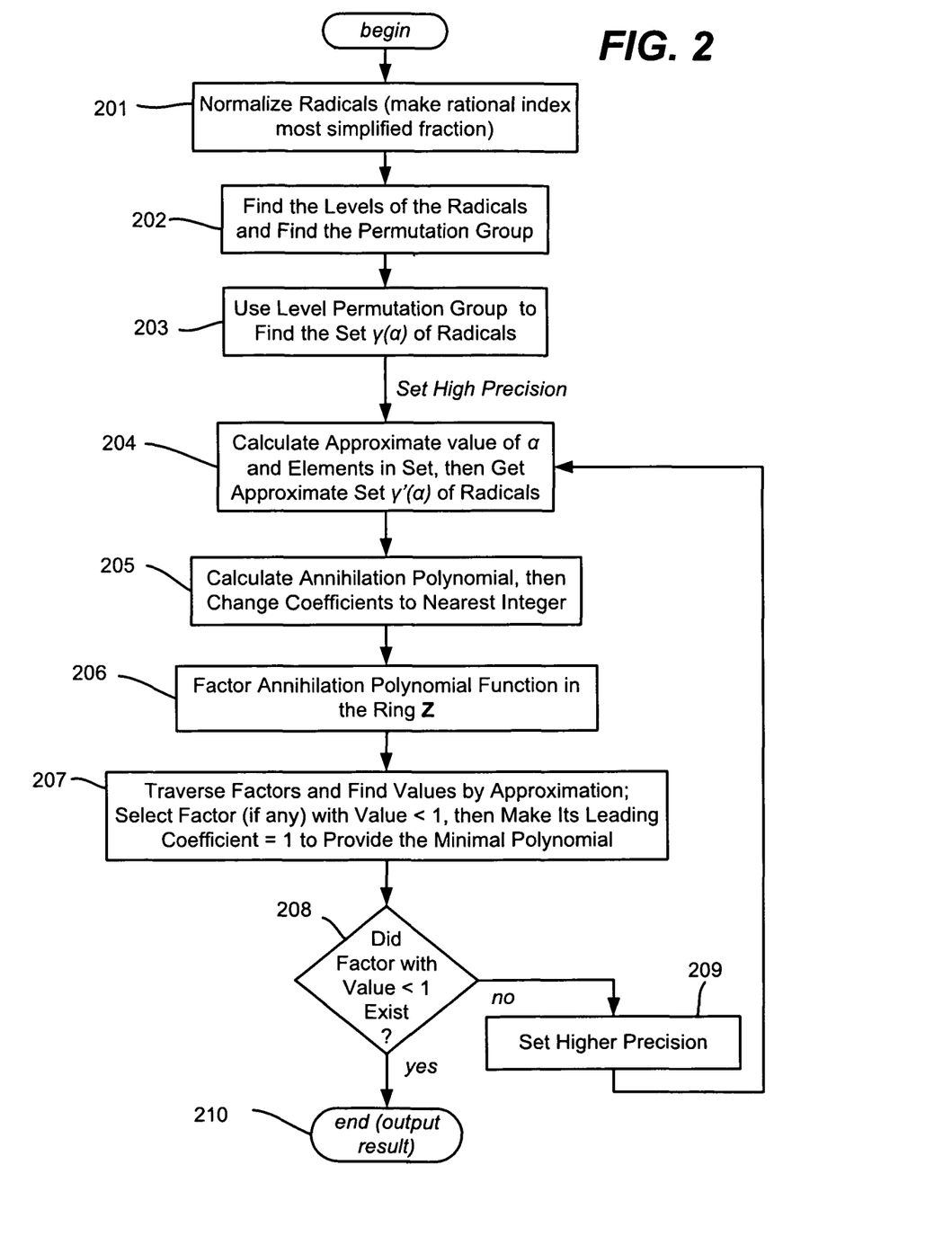
FIG. 2 is a flow diagram showing example steps taken to compute the minimal polynomial of a radical expression over the ring Z.
Figure 3:
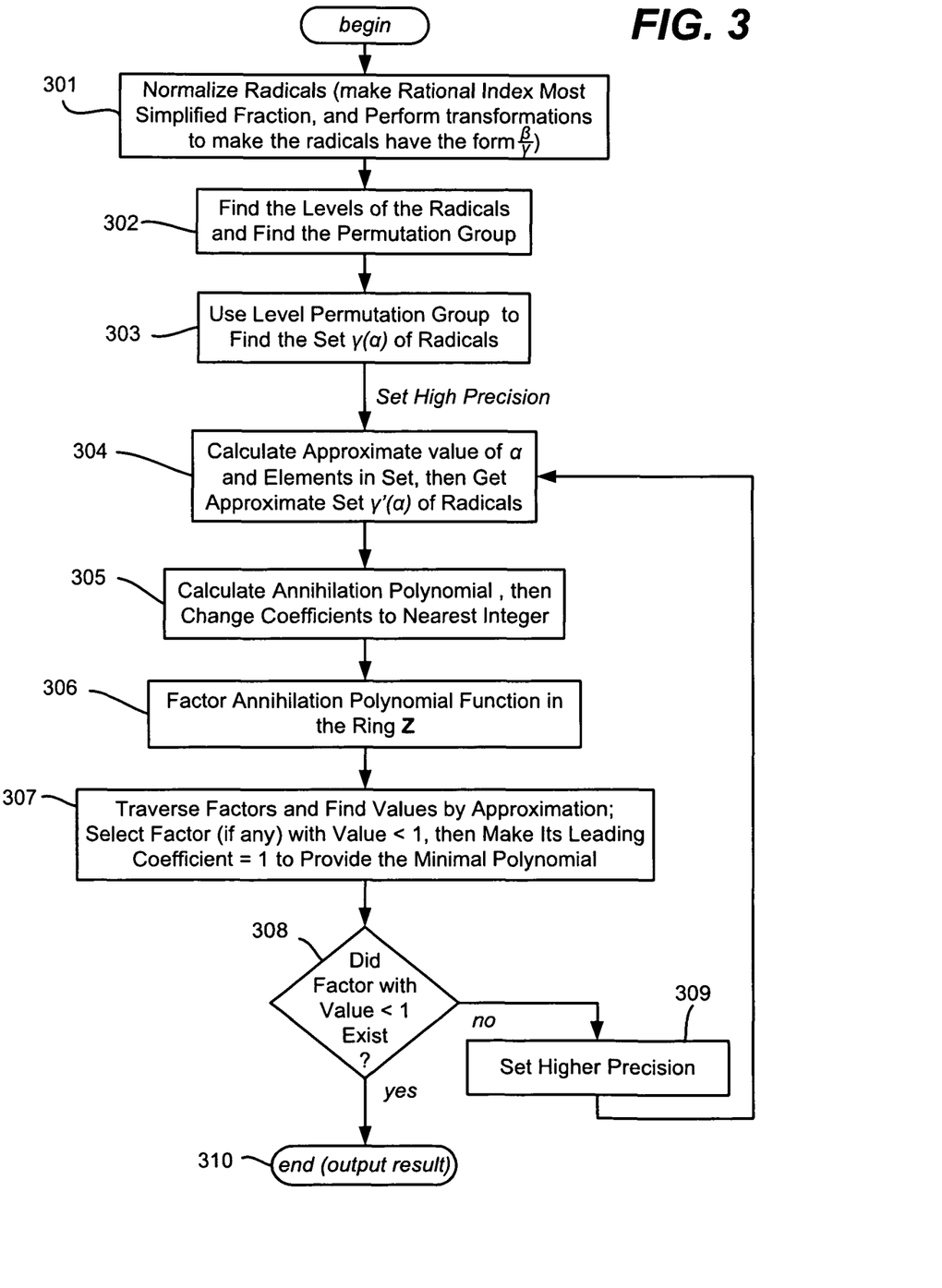
FIG. 3 is a flow diagram showing example steps taken to compute the minimal polynomial of a radical expression over the ring Q.

FIGS. 2 and 3, representing the algorithms below, summarize the logic 104 to find the minimal polynomial, using algorithms for radicals over Z, Q, Q[x], Q[x, y, . . . , z], Z[x], Z[x, y, . . . , z] respectively.

Algorithm for radicals $\alpha$ over ring Z (FIG. 2):

---

Step 201: normalize the radicals, to make the rational index in the radicals be most simplified fraction.
Step 202: find the levels of the radicals and find the permutation group.
Step 203: find the set $\gamma(\alpha) = \{\alpha_1, \alpha_2, \ldots, \alpha_n\}$
Step 204: set a high precision, calculate the approximate value of $\alpha$ and every element in $\gamma(\alpha)$, then get
$\gamma'(\alpha) = \{appro(\alpha_1), appro(\alpha_2), \ldots, appro(\alpha_n)\}$ and $appro(\alpha)$
Step 205: calculate the annihilation polynomial $f(x) = \Pi_{i-1}^{n}(x - appro(\alpha_i))$, then change every coefficient ot f(x) with its nearest integer.
Step 206: factor f(x) in the ring Z[x].
Step 207: traverse every factor of f(x) and find the value of the factor by setting $x = appro(\alpha)$, select the factor whose value is less than one, then make its leading coefficient one to provide the minimal polynomial. If this kind of factor does not exist (step 208), return to step 204 after setting a higher precision (step 209).

---

Algorithm for radicals $\alpha$ over ring Q:

---

Step 301: normalize the radicals $\alpha$ by making the rational index in the radicals be most simplified fraction and perform transformations to make the radicals have the form $\frac{\beta}{\gamma}$, where $\beta$ and $\gamma$ are radicals over Z;

use $\alpha$ to denote the new radicals.
Step 302: find all levels of the radicals and find the permutation group.

Step 303: find the set $\gamma(\alpha) = \left\{\frac{\beta_1}{\gamma_1}, \frac{\beta_2}{\gamma_2}, \ldots, \frac{\beta_n}{\gamma_n}\right\}$.

Step 304: set a high precision, then get the approximate value $\gamma'(\alpha) = \left\{appro\left(\frac{\beta_1}{\gamma_1}\right), appro\left(\frac{\beta_2}{\gamma_2}\right), \ldots, appro\left(\frac{\beta_n}{\gamma_n}\right)\right\}$ and $appro(\gamma_i)$.

Step 305: calculate the annihilation polynomial $f(x) = \prod_{i=1}^{m} appro(\gamma_i) \prod_{i=1}^{m}\left(x - \frac{\beta_i}{\gamma_i}\right),$ then change every coefficient of f(x) with its nearest integer.
Step 306: factor f(x) in the ring Z[x].
Step 307: traverse every factor of f(x) and find the value of the factor by setting $x = appro(\alpha)$, select the factor whose value is less than 1, then make its leading coefficient be 1 to get the minimal polynomial.
If this kind of factor does not exist (step 308), return to step 304 after setting a higher precision (step 309).

---

Step 210 or 310 represent outputting the resulting minimal polynomial, e.g., to another component of the computer software program for further processing or outputting to the user.

Exemplary Operating Environment

Figure 4:
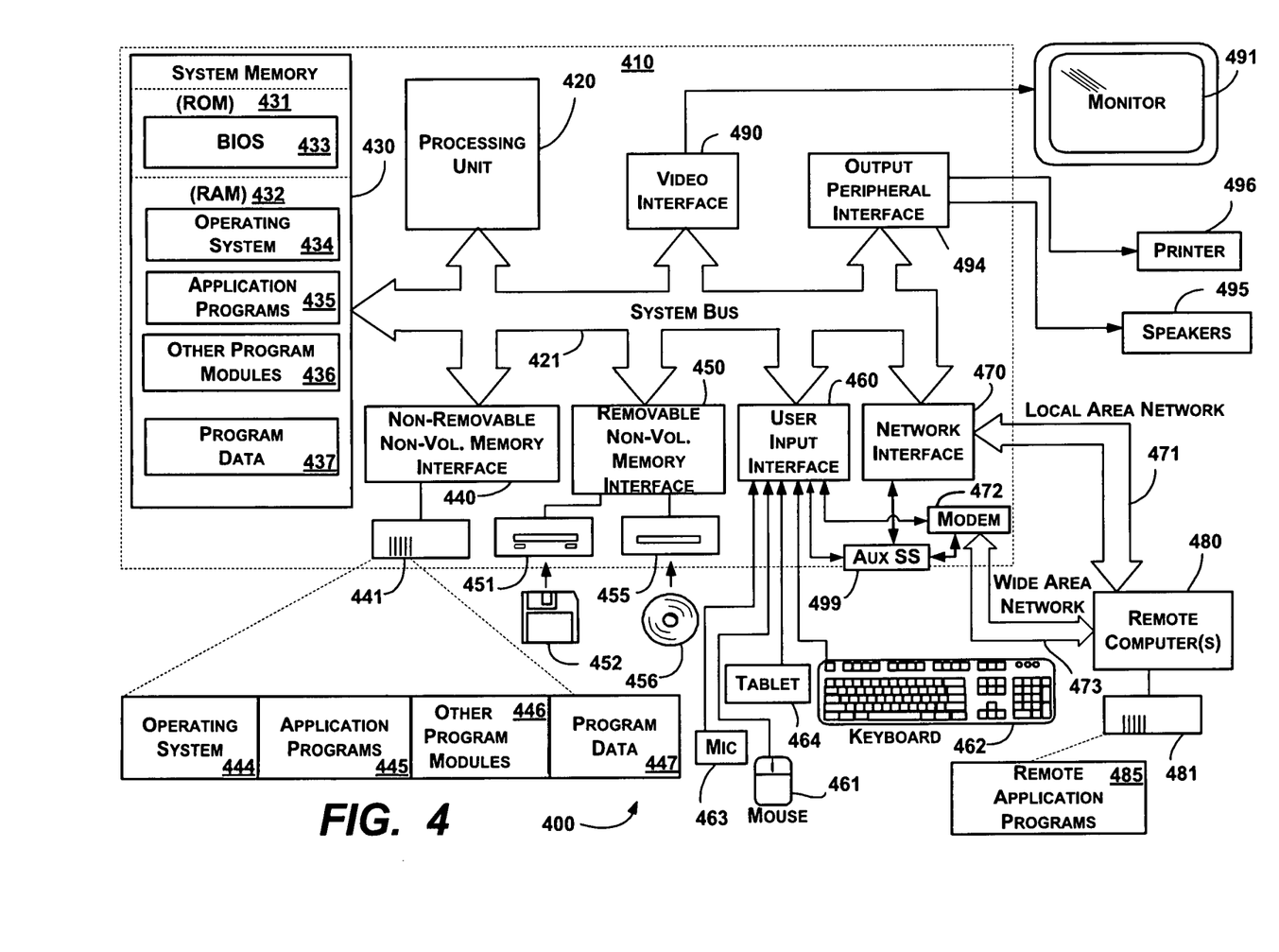
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising, finding a level permutation set based upon levels of radicals, determining whether the radicals are radicals over a ring of integer numbers or radicals over a ring of rational numbers based upon whether there is a division operation in the radicals, computing approximate values of elements in the level permutation set, determining an annihilation polynomial based upon the approximate values of the elements, factoring the annihilation polynomial in a ring to obtain factors, traversing the factors based upon an approximate value of the radicals, and selecting a factor to obtain a minimal polynomial.

2. The method of claim 1 wherein finding the level permutation set comprises determining level permutation groups and constructing successive actions based upon the level permutation groups.

3. The method of claim 1 further comprising determining whether the radicals correspond to a ring radical or a division of two ring radicals.

4. The method of claim 1, wherein determining whether the radicals are radicals over a ring of integer numbers or radicals over a ring of rational numbers comprises detecting the division operation in the radicals.

5. The method of claim 1 further comprising normalizing the radicals.

6. The method of claim 1 further comprising finding the levels of the radicals.

7. The method of claim 1 further comprising changing coefficients of the annihilation polynomial to a nearest integer.

8. The method of claim 1 wherein selecting the factor comprises choosing a factor with a value less than one, and setting a leading coefficient of the selected factor to one.

9. The method of claim 1 wherein selecting the factor comprises determining whether there is a factor with a value less than one, and if not, increasing a precision and iteratively, until there is a factor with a value less than one, re-computing approximate values of elements in the level permutation set, re-determining an annihilation polynomial based upon the approximate values of the elements, re-factoring the annihilation polynomial in a ring to obtain factors, and re-traversing the factors.

10. The method of claim 9 wherein selecting the factor comprises choosing a factor with a value less than one, and setting a leading coefficient of the selected factor to one.

11. The method of claim 1 further comprising outputting the minimal polynomial as a result.

12. One or more non-transitory computer-readable storage media having computer-executable instructions, which when executed perform steps, comprising, (a) finding a level permutation set based upon levels of radicals, the radicals are radicals over a ring of integer numbers or radicals over a ring of rational numbers based upon whether at least one at least one division operation is detected; (b) selecting a selected precision; (c) using the selected precision to compute approximate values of elements in the level permutation set and an approximate value of the radicals; (d) determining an annihilation polynomial based upon the approximate values of the elements; (e) factoring the annihilation polynomial in a ring to obtain factors; (f) traversing the factors based upon the approximate value of the radicals; (g) determining whether a factor exists having a value less than one, and (i) if not, setting a higher precision as the selected precision and returning to step (c), and (ii) if so, outputting a minimal polynomial based on the factors.

13. The one or more computer-readable storage media of claim 12 having further computer-executable instructions comprising normalizing the radicals.

14. The one or more computer-readable storage media of claim 12 wherein a factor having a value less than one exists, and having further computer-executable instructions comprising selecting that factor, and changing a leading coefficient of that factor to one to obtain the minimal polynomial.

15. The one or more computer-readable storage media of claim 12 having further computer-executable instructions comprising, determining whether the radicals are the ring over integers, or the ring over rational numbers.

16. The one or more computer-readable storage media of claim 12 having further computer-executable instructions comprising, after step (d), changing coefficients the annihilation polynomial to each have an integer value.

17. In a computing environment, a system comprising, a permutation set finding mechanism that determines whether radicals are radicals in a ring over integers or radicals in a ring over rational numbers based upon whether at least one at least one division operation is detected and uses levels corresponding to the radicals to find a level permutation set, a computation mechanism that computes an annihilation polynomial based upon the level permutation set, a factoring mechanism that determines factors of the annihilation polynomial, and a selection mechanism that selects a minimal polynomial based upon the factors.

18. The system of claim 17 wherein the permutation set finding mechanism includes means for differentiating between radicals over ring Z of integer numbers or ring Q of rational numbers by detecting the at least one division operation in the radicals.

19. The system of claim 17 wherein the level finding mechanism, the expand mechanism and the selection mechanism are incorporated into a computational software program.

* * * * *